UNITED STATES PATENT OFFICE.

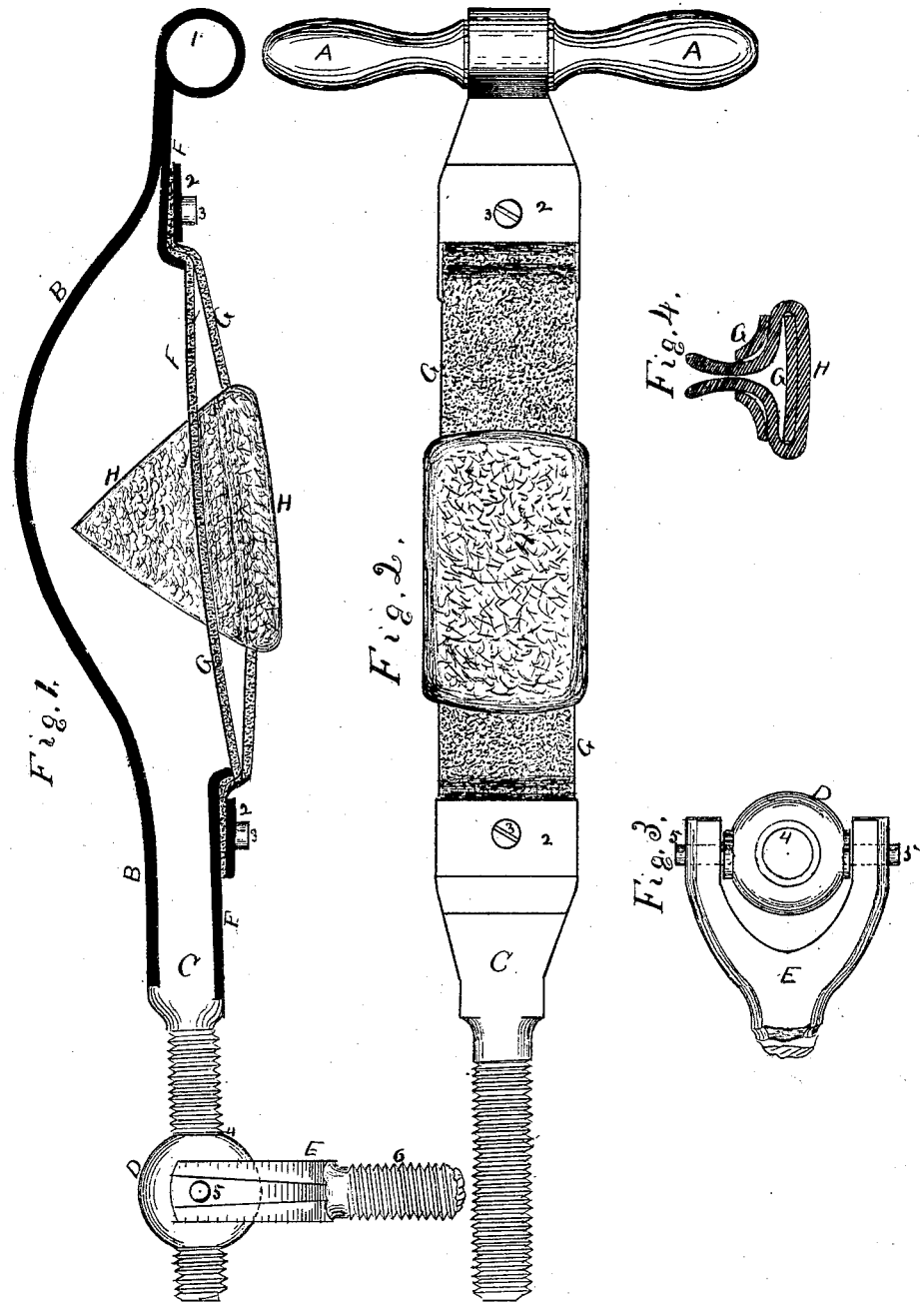

JAY NORTHROP AND JAMES F. EMMONS, OF BRIDGEPORT, CONNECTICUT.

IMPROVEMENT IN IMPLEMENTS FOR ALLURING HAT-BODIES.

Specification forming part of Letters Patent No. 114,327, dated May 2, 1871.

We, JAY NORTHROP and JAMES F. EMMONS, of Bridgeport, county of Fairfield, State of Connecticut, have invented a new and useful Implement for Alluring Hats, of which the following is a specification:

Nature and Object of our Invention.

The first part of our invention relates to the combination of a hand and bow lever, universal joint, fulcrum-screw, tension-strap, and alluring-felt in such a manner that the alluring-felt can be forced onto the hat-body as it revolves in the lathe, regardless of the oblong form of the body.

The object of our invention is to increase the friction on the hat-body, and give a high polish to an oblong hat-body without the severe jar to the hands and arms usual when the alluring material is forced onto the body directly by them.

Description of Accompanying Drawing.

Figure 1 is a side view of implement. Fig. 2 shows the tension-strap and felt; Fig. 3, detail of joint; Fig. 4, section of tension-strap and felt.

General Description.

A, Fig. 1, is a turned wood handle; B B, bow-spring; C, shank and screw; D, nut of joint; E, yoke and screw; F F, tension-strap clamps; G, tension-straps; H, felt.

The bow-spring B can be constructed of steel, brass, or iron. To receive the handle A, the eye 1 is formed by turning the spring flatwise around a former. The opposite end is secured to the shank C by welding-screw, brazing, or any desirable method.

The clamps F F are secured to the spring and shank by any desirable method. The outer plates, 2 2, are held in position with the screws 3 3 or the opposite end of tension-strap. These clamps can be made larger, and allow them to act as springs between the clamps and where they are secured to the shank and bow-spring.

The tension-strap G can be of felt, leather, rubber, or canvas, and receive tension by drawing the clamps F F together by bending of the bow-spring B B, and securing them in place by the outer plates, 2 2, and screws 3 3. In the inner strap a slot is cut for the purpose of securing the finishing-felt to polish the hat.

The globe-nut 4 receives the shank-screw, in which it revolves freely to allow for turning the implement. To follow around the curve of the hat-body this globe-nut is held in position by the yoke E and centerer 5 5, on which the nut works. This forms a hinge by which the implement can work up or down.

On the lower end of yoke, or on its shank, the screw 6 6 is cut. This is screwed into the back of lathe, and is so fitted that it can be easily turned up or down. This joint confines the back, and acts as a fulcrum for the implement, while it allows of its being turned in any direction to follow the curve of the hat body or crown, enabling the operator to apply any degree of friction he wills onto the hat-body.

Claim.

What we claim as our invention, and desire to secure by Letters Patent, is—

In an implement for alluring hat-bodies, consisting of the handle A, bow-spring B, shank and screw G, nut D, yoke and screw E, clamp F F, tension-straps G G, and felt pad H, constructed as specified and shown.

In testimony whereof we have signed our names to this specification before two subscribing witnesses.

JAY NORTHROP.
JAMES F. EMMONS.

Witnesses:
 GEORGE L. HUBBELL,
 A. SKAAT.